(12) United States Patent
Laaksonen et al.

(10) Patent No.: US 10,993,067 B2
(45) Date of Patent: Apr. 27, 2021

(54) APPARATUS AND ASSOCIATED METHODS

(71) Applicant: Nokia Technologies Oy, Espoo (FI)

(72) Inventors: Lasse Juhani Laaksonen, Tampere (FI); Anssi Rämö, Tampere (FI); Arto Lehtiniemi, Lempaala (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/623,543

(22) PCT Filed: Jun. 13, 2018

(86) PCT No.: PCT/FI2018/050443
§ 371 (c)(1),
(2) Date: Dec. 17, 2019

(87) PCT Pub. No.: WO2019/002667
PCT Pub. Date: Jan. 3, 2019

(65) Prior Publication Data
US 2020/0145778 A1    May 7, 2020

(30) Foreign Application Priority Data

Jun. 30, 2017 (EP) ..................................... 17178912

(51) Int. Cl.
*H04S 7/00* (2006.01)
*G06F 3/01* (2006.01)
(Continued)

(52) U.S. Cl.
CPC .............. *H04S 7/304* (2013.01); *G06F 3/012* (2013.01); *G06F 3/017* (2013.01); *H04R 3/005* (2013.01);
(Continued)

(58) Field of Classification Search
None
See application file for complete search history.

(56) References Cited

U.S. PATENT DOCUMENTS 7,587,053 B1 * 9/2009 Pereira .................. H04R 3/005
381/387
8,509,454 B2   8/2013 Kirkeby et al.
(Continued)

FOREIGN PATENT DOCUMENTS

| CN | 103181192 A | 6/2013 |
| EP | 3098690 A1 | 11/2016 |
| WO | 01/055833 A1 | 8/2001 |

OTHER PUBLICATIONS

"Nx Head Tracker for Headphones", Waves, Retrieved on Dec. 12, 2019, Webpage available at : https://www.waves.com/hardware/nx-head-tracker.

(Continued)

*Primary Examiner* — Paul W Huber
(74) *Attorney, Agent, or Firm* — Nokia Technologies Oy

(57) ABSTRACT

An apparatus configured to use captured spatial audio content captured by a rotatable spatial audio capture microphone array, the captured spatial audio content defining the three-dimensional arrangement of the audio in the scene, an orientation of the aural scene defined relative to the microphone array at the time of audio capture, and use captured direction data representative of the direction of a reference direction of said microphone array relative to the scene over a time during which said spatial audio content was captured; to generate modified spatial audio content in which the aural scene is decoupled from any rotation of the rotatable spatial audio capture microphone array that occurred during capture of the spatial audio content for presentation to the recipient user relative to a space in which the recipient user is located (Continued)

by virtue of modification of the orientation of the aural scene using the captured direction data.

20 Claims, 6 Drawing Sheets

(51) Int. Cl.
*H04R 3/00* (2006.01)
*H04R 3/04* (2006.01)
*H04R 5/027* (2006.01)
*H04R 5/033* (2006.01)
*H04R 5/04* (2006.01)

(52) U.S. Cl.
CPC ............... *H04R 3/04* (2013.01); *H04R 5/027* (2013.01); *H04R 5/033* (2013.01); *H04R 5/04* (2013.01); *H04S 7/307* (2013.01); *H04S 2400/13* (2013.01); *H04S 2420/01* (2013.01)

(56) References Cited

U.S. PATENT DOCUMENTS

| | | |
|---|---|---|
| 2003/0031334 A1 | 2/2003 | Layton et al. |
| 2005/0147261 A1* | 7/2005 | Yeh ....................... H04M 3/568 |
| | | 381/92 |
| 2013/0236040 A1 | 9/2013 | Crawford et al. |
| 2014/0198918 A1* | 7/2014 | Li ........................... H04S 7/30 |
| | | 381/26 |
| 2014/0348342 A1 | 11/2014 | Laaksonen et al. |
| 2015/0326966 A1 | 11/2015 | Mehra et al. |
| 2016/0134988 A1 | 5/2016 | Gorzel et al. |
| 2017/0195576 A1* | 7/2017 | Desai ................. H04N 5/23238 |

OTHER PUBLICATIONS

"Sony's 'Joshua Bell VR Experience' on PSVR is Among the Best VR Video You'll Find on Any Headset", Roadtovr, Retrieved on Dec. 12, 2019, Webpage available at : https://www.roadtovr.com/now-psvr-sonys-joshua-bell-vr-experience-among-best-vr-video-youll-find-headset/.

Ben-Joseph et al., "Gaze Direction in Virtual Reality Using Illumination Modulation and Sound", Stanford, 2016, 5 pages.

Extended European Search Report received for corresponding European Patent Application No. 17178912.6, dated Nov. 17, 2017, 9 pages.

International Search Report and Written Opinion received for corresponding Patent Cooperation Treaty Application No. PCT/FI2018/050443, dated Jul. 20, 2018, 12 pages.

Office Action received for corresponding European Patent Application No. 17178912.6, dated May 25, 2020, 7 pages.

Office Action received for corresponding Indian Patent Application No. 201947052122, dated Jan. 18, 2021, 7 pages.

Office action received for corresponding Chinese Patent Application No. 201880051725.X, dated Dec. 28, 2020, 9 pages of office action and 3 pages of Translation available.

* cited by examiner

APPARATUS AND ASSOCIATED METHODS

RELATED APPLICATION

This application was originally filed as PCT Application No. PCT/FI2018/050443, filed on Jun. 13, 2018, which claims priority from EP Application No. 17178912.6, filed on Jun. 30, 2017.

TECHNICAL FIELD

The present disclosure relates to the field of virtual reality and, in particular, to the field of review of modifications to capture properties of virtual reality content in a virtual or augmented reality view, associated methods, computer programs and apparatus.

BACKGROUND

The capture of virtual reality content is becoming more common, with virtual reality content producers producing live and recorded virtual reality content. Ensuring such virtual reality content has high production values is important. The capture of virtual reality content may require modification of capture properties to improve or modify the virtual reality content, such as to allow a content producer to create quality content and/or achieve a desired stylistic effect in the resultant virtual reality content.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code,
  the at least one memory and the computer program code configured to, with the at least one processor, cause the apparatus to perform at least the following:
  use
    captured spatial audio content captured by a rotatable spatial audio capture microphone array, the captured spatial audio content defining an aural scene comprising the audio of a scene surrounding the spatial audio capture microphone array defined such that the three-dimensional arrangement of the audio in the scene is audibly presentable to a recipient user, an orientation of the aural scene defined relative to the rotatable spatial audio capture microphone array at the time of audio capture, and
    captured direction data associated with the spatial audio content and representative of the direction of a reference direction of said spatial audio capture microphone array relative to the scene over a time during which said spatial audio content was captured;
  to generate modified spatial audio content in which the aural scene is decoupled from any rotation of the rotatable spatial audio capture microphone array that occurred during capture of the spatial audio content for presentation to the recipient user relative to a space in which the recipient user is located by virtue of modification of the orientation of the aural scene using the captured direction data.

In one or more examples, as the orientation of the aural scene of the modified spatial audio content is defined relative to the space in which the recipient user is located it will be appreciated that the apparatus may be caused to provide for presentation of the modified spatial audio based on the orientation of the recipient user's head relative to the space such that irrespective of movement of the recipient user's head the audio is perceived as originating from the same direction in the space. Accordingly, audio heard from a particular point in the space will remain at that point in the space as the recipient user moves their head to look around.

In one or more embodiments, the apparatus is caused to provide for presentation of the modified spatial audio content as spatial audio to the recipient user and provide for application of a spatially localised audio effect to the audio of the aural scene based on the reference direction at the time when the spatial audio content was captured to indicate where in the aural scene the reference direction was pointing when the captured spatial audio content was captured, the localised audio effect configured to cause one or more of
  i) an increase in loudness;
  ii) a modification in loudness of one or more frequency components; and
  iii) a modification in frequency of one or more frequency components;
relative to a remainder of the audio presented to the recipient user.

In one or more embodiments, the provision of the spatially localised audio effect is further based on there being a misalignment, above a misalignment threshold, between the reference direction and a current user-viewing-direction comprising the current direction in which the recipient user is looking relative to the aural scene presented to them as spatial audio.

In one or more embodiments, the apparatus is caused to provide for presentation of the modified spatial audio content as spatial audio to the recipient user and based on the captured direction data and a current user-viewing-direction comprising the current direction in which the recipient user is looking relative to the aural scene presented to them as spatial audio, and wherein the current user-viewing direction is currently aligned, within a threshold distance, with the reference direction;
  provide for presentation of a view-direction-aligned indicator to the recipient user, the presentation of the view-direction-aligned indicator thereby indicative of the recipient user looking in the same direction relative to the aural scene as the reference direction of the spatial audio capture microphone array relative to the scene when the spatial audio content was captured.

In one or more embodiments, the reference direction of said spatial audio capture microphone array relative to the scene comprises a viewing direction of a user located in said scene, termed a capture user, at the time of capture of said captured spatial audio content, the spatial audio capture microphone array rotatable in accordance with the viewing direction of the capture user.

In one or more embodiments, the at least rotatable spatial audio capture microphone array is configured to be mounted to a capture user's head.

In one or more embodiments, the spatial audio content is presented live to the recipient user.

In one or more embodiments, the apparatus is caused to provide for presentation of the modified spatial audio content as spatial audio to the recipient user and the reference direction of said spatial audio capture microphone array relative to the scene comprises a viewing direction of a user located in said scene, termed a capture user, at the time of capture of said captured spatial audio content and the spatial audio content is presented live to the recipient user; and based on the viewing direction of the capture user relative to the scene aligning, within a threshold, with a current user-viewing-direction of the recipient user relative to the aural scene, such that the capture user and the recipient user have substantially the same orientation relative to the scene and the aural scene respectively;

provide for opening of a communication channel between devices of the capture user and the recipient user to enable direct audio communication therebetween.

In one or more embodiments, based on the opening of the communication channel, the apparatus is caused to provide for presentation of one or more communication-channel-open indicators to inform one or both of the recipient user and the capture user of the open communication channel.

In one or more examples, the communication-channel-open indicator comprises one or more of:

i) a graphical indicator provided to a respective display viewable by the one or both of the recipient user and the capture user;

ii) an aural indicator provided to a respective speaker audible to the one or both of the recipient user and the capture user;

iii) a haptic indicator provided to a respective haptic feedback module associated with the one or both of the recipient user and the capture user.

In one or more embodiments, the captured spatial audio content comprises spatial audio content from a plurality of rotatable spatial audio capture microphone arrays, each array associated with a respective one of a plurality of capture users, the plurality of capture users optionally located in the same scene, and the aural scene presented to the recipient user is a combination of the aural scenes captured by the plurality of rotatable spatial audio capture microphone arrays wherein;

based on the viewing direction of any one of the plurality of capture users relative to the scene aligning, within a threshold, with a current user-viewing-direction of the recipient user, the current user-viewing-direction comprising the current direction in which the recipient user is looking relative to the aural scene, such that said one capture user and the recipient user hear the same audio in front of them;

provide for opening of a communication channel between the said any one of the plurality of capture users and the recipient user to enable direct audio communication therebetween.

In one or more embodiments, the provision of the spatially localised audio effect is further based on scene configuration data, the scene configuration data captured by a sensor located in the scene and representative of the physical configuration of the scene at least between the spatial audio capture microphone array and one or more audio sources in the scene to indicate whether the spatial audio capture microphone array has an obstructed or unobstructed view of the one or more audio sources; and wherein;

the apparatus is caused to provide for application of a first spatially localised audio effect to the audio of the aural scene of the modified captured spatial audio based on the reference direction at the time when the spatial audio was captured and if the one or more audio sources are unobstructed based on the scene configuration data; and the apparatus is caused to provide for application of a second spatially localised audio effect to the audio of the aural scene of the modified captured spatial audio based on the reference direction at the time when the spatial audio was captured and if the one or more audio sources are obstructed based on the scene configuration data, the second spatially localised audio effect different to the first spatially localised audio effect.

In one or more embodiments, the spatial audio capture microphone array is rotatable and translatable in the scene such that the array has six degrees of freedom in said scene and, based on captured location data defining translational movement of the array in the scene during capture of the spatial audio content, the apparatus is caused to generate the modified spatial audio content in which the aural scene is decoupled from both any translational movement of the array and any rotation of the array that occurred during capture of the spatial audio content for presentation to the recipient user relative to a space in which the recipient user is located by virtue of modification of a position of the aural scene and the orientation of the aural scene using the captured location data and captured direction data.

In one or more embodiments, the apparatus is caused to provide for presentation of the modified spatial audio content as spatial audio to the recipient user.

In a further aspect there is provided a method, the method comprising:

based on captured spatial audio content captured by a rotatable spatial audio capture microphone array, the captured spatial audio content defining an aural scene comprising the audio of a scene surrounding the spatial audio capture microphone array defined such that the three-dimensional arrangement of the audio in the scene is audibly presentable to a recipient user, an orientation of the aural scene defined relative to the rotatable spatial audio capture microphone array at the time of audio capture, and based on captured direction data associated with the spatial audio content and representative of the direction of a reference direction of said spatial audio capture microphone array relative to the scene over a time during which said spatial audio content was captured;

generating modified spatial audio content in which the aural scene is decoupled from any rotation of the rotatable spatial audio capture microphone array that occurred during capture of the spatial audio content for presentation to the recipient user relative to a space in which the recipient user is located by virtue of modification of the orientation of the aural scene using the captured direction data.

In a further aspect there is provided a computer readable medium comprising computer program code stored thereon, the computer readable medium and computer program code being configured to, when run on at least one processor, perform the method of:

based on captured spatial audio content captured by a rotatable spatial audio capture microphone array, the captured spatial audio content defining an aural scene comprising the audio of a scene surrounding the spatial audio capture microphone array defined such that the three-dimensional arrangement of the audio in the scene is audibly presentable to a recipient user, an orientation of the aural scene defined relative to the rotatable spatial audio capture microphone array at the time of audio capture, and based on captured direction data associated with the spatial audio content and representative of the direction of a reference direction of said spatial audio capture microphone array relative to the scene over a time during which said spatial audio content was captured;

generating modified spatial audio content in which the aural scene is decoupled from any rotation of the rotatable spatial audio capture microphone array that occurred during capture of the spatial audio content for presentation to the recipient user relative to a space in which the recipient user is located by virtue of modification of the orientation of the aural scene using the captured direction data.

In a further aspect there is provided an apparatus, the apparatus comprising means configured to;

use captured spatial audio content captured by a rotatable spatial audio capture microphone array, the captured spatial audio content defining an aural scene comprising the audio of a scene surrounding the spatial audio capture microphone array defined such that the three-dimensional arrangement of the audio in the scene is audibly presentable to a recipient user, an orientation of the aural scene defined relative to the rotatable spatial audio capture microphone array at the time of audio capture, and captured direction data associated with the spatial audio content and representative of the direction of a reference direction of said spatial audio capture microphone array relative to the scene over a time during which said spatial audio content was captured;

to generate modified spatial audio content in which the aural scene is decoupled from any rotation of the rotatable spatial audio capture microphone array that occurred during capture of the spatial audio content for presentation to the recipient user relative to a space in which the recipient user is located by virtue of modification of the orientation of the aural scene using the captured direction data.

The present disclosure includes one or more corresponding aspects, examples or features in isolation or in various combinations whether or not specifically stated (including claimed) in that combination or in isolation. Corresponding means and corresponding functional units (e.g., function enabler, spatial audio presenter, spatial audio modifier, movement tracker, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
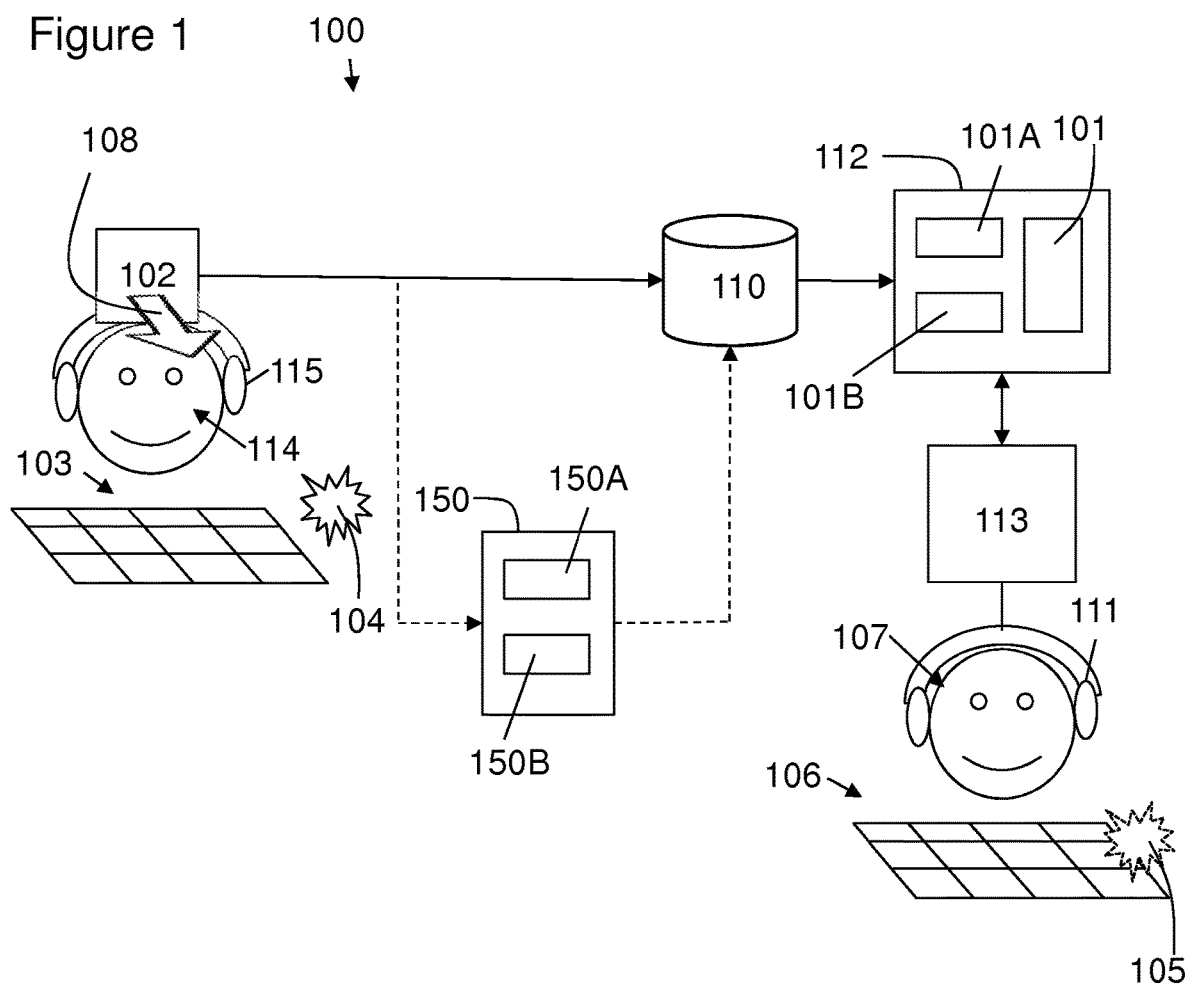
FIG. 1 illustrates an example apparatus for providing for audible presentation of spatial audio captured by a spatial audio capture microphone array that may rotate during capture as well as an example apparatus for generation of spatial audio content decoupled from movement of the array.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content displayed around them. In one or more examples, the VR apparatus may provide signalling to speakers or headphones for presentation of VR content comprising spatial audio. The virtual reality scene may therefore comprise the VR content audibly presented so that the user feels immersed in an audio scene, as if they were there, and may look around and hear the audio presented around them. The virtual reality scene may replicate a real world scene to simulate the user being physically present at a real world location or the virtual reality scene may be computer generated or a combination of computer generated and real world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may be provided by a panoramic video (such as a panoramic live broadcast), comprising a video having a wide or 360° field of view (or more, such as above and/or below a horizontally oriented field of view). A panoramic video may have a wide field of view in that it has a spatial extent greater than a field of view of a user or greater than a field of view with which the panoramic video is intended to be displayed.

The VR content provided to the user may comprise live or recorded images of the real world, captured by a VR content capture device, for example. An example VR content capture device comprises a Nokia Technologies OZO device. As the VR scene is typically larger than a portion a user can view with the VR display, the VR apparatus may provide, for display on the VR display, a virtual reality view of the VR scene to a user, the VR view showing only a spatial portion of the VR content that is viewable at any one time. The VR apparatus may provide for panning around of the VR view in the VR scene based on movement of a user's head and/or eyes. A VR content capture device may be configured to capture VR content for display to one or more users. A VR content capture device may comprise one or more cameras and one or more (e.g. directional) microphones, such as a microphone array, configured to capture the surrounding visual and aural scene from a capture point of view. Thus, a musical performance may be captured (and recorded) using a VR content capture device, which may be placed on stage, with the performers moving around it or from the point of view of an audience member. In each case a consumer of the VR content may be able to look around using the VR display of the VR apparatus to experience the performance at the capture location as if they were present. In one or more examples, the one or more cameras of the VR content capture device may be optional and the microphone(s) or microphone array may capture the audio of the scene.

Augmented reality (AR) may use an AR display, such as glasses or goggles or a virtual retinal display, to augment a view of the real world (such as seen through the glasses or goggles) with computer generated content. An augmented reality apparatus, which may or may not include an AR display, may provide for presentation of multimedia AR content configured to be overlaid over the user's view of the real-world. Thus, a user of augmented reality may be able to view the real world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world.

In addition to the audio received from the microphone(s) of the VR content capture device further microphones each associated with a distinct audio source may be provided. In one or more examples, the VR content capture device may not have microphones and the aural scene may be captured by microphones remote from the VR content capture device. Thus, microphones may be provided at one or more locations within the real world scene captured by the VR content capture device, each configured to capture audio from a distinct audio source. For example, using the musical performance example, a musical performer or a presenter may have a personal microphone, such as a close-up or lavalier microphone. Knowledge of the location of each distinct audio source may be obtained by using transmitters/receivers or identification tags to track the position of the audio sources, such as relative to the VR content capture device, in the scene captured by the VR content capture device. Thus, the VR content may comprise the visual imagery captured by one or more VR content capture devices and the audio captured by the one or more VR content capture devices and, optionally/alternatively, one or more further microphones. The location of the further microphones may be provided for providing spatial audio.

Spatial audio comprises audio presented in such a way to a user that it is perceived to originate from a particular location, as if the source of the audio was located at that particular location. Thus, virtual reality content may be provided with spatial audio having directional properties, such that the audio is perceived to originate from a point in the VR space, which may be linked to the imagery of the VR content. Augmented reality may be provided with spatial audio, such that the spatial audio is perceived as originating from real world objects visible to the user and/or from augmented reality graphics overlaid over the user's view.

Spatial audio may be presented independently of visual virtual reality or visual augmented reality content. Nevertheless, spatial audio, in some examples, may be considered to be augmented reality content because it augments the aural scene perceived by a user. As an example of independent presentation of spatial audio, a user may wear headphones and, as they explore the real world, they may be presented with spatial audio such that the audio appears to originate at particular locations associated with real world objects or locations. For example, a city tour could be provided by a device that tracks the location of the user in the city and presents audio describing points of interest as spatial audio such that the audio appears to originate from the point of interest around the user's location. As another example, a teleconference between multiple parties could be presented as spatial audio such that the voice (i.e. audio) of each party is perceived as originating from a different particular location in space. As a further example, a virtual reality communications call between two parties could be captured by a spatial microphone array worn by a first user and transmitted to a headphone device of a second user. Such virtual reality communications call could be symmetric, i.e., the same setup could be used in both directions providing a virtual reality audio experience based on capture at the other end to both users, or it could be asymmetric, i.e., this experience could be provided for only one of the users, whereas the other direction could be, e.g., a traditional voice call (one channel of monaural audio). For a virtual reality communications call, one or both of the users may be presented with spatial audio such that they experience the audio scene heard by the other user with corresponding perceived directions to sources of audio in the scene.

The spatial positioning of the spatial audio may be provided by the degree to which audio is presented to each channel of a multichannel audio arrangement, as well as by 3D audio effects, such as those that utilise a head related transfer function to create a spatial audio space in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. The headphones may be head-tracked so that movements of the user's head can be accounted for in the presentation of the spatial audio so that the audio is heard from the appropriate directions.

The capture of spatial audio may be provided by a spatial audio capture microphone array that may be free to rotate during capture of the audio, such as an array mounted to a headset or the like of a "capture user". In other examples, the spatial audio capture microphone array may be attached to a boom or robot that may cause rotation of the array during capture of the spatial audio. It will be appreciated that with a rotatable spatial audio capture microphone array the direction towards audio from the scene relative to the array will change with rotation of the array. This may result in generation of confusing spatial audio with what may be perceived as random variations (caused by rotation of the array during capture) in the direction from which the audio is heard when said spatial audio is presented to a recipient user.

Accordingly, the presentation of spatial audio when it is captured from rotatable spatial audio capture microphone arrays, such as head mounted arrays, may be challenging.

The captured spatial audio content may define an aural scene such that the arrangement of audio in a scene can be captured (as the aural scene) and then presented to recreate the three-dimensional audible experience of being in that scene. Thus, the aural scene may be considered representative of a three-dimensional audio environment in which audio is perceived to be heard from different directions in the three-dimensional audio environment. In general, the captured spatial audio captured by the spatial audio capture microphone array comprises the audio of a scene surrounding the spatial audio capture microphone array defined such that the three-dimensional arrangement of the audio in the scene is audibly presentable to a recipient user.

Captured spatial audio content may be captured and/or encoded in many different ways. In one or more examples, the captured spatial audio may be considered to comprise an aural scene defined by audio objects that have an associated position in the aural scene. The audio objects may represent audio sources in the scene being captured or may be computer generated. Accordingly, when presented to a user, the position of the audio objects is used to render the spatial audio such that the user perceives the arrangement of the audio objects in the aural scene. In one or more examples, the captured spatial audio may be considered to comprise an aural scene encoded using ambisonic processing techniques. Ambisonic processing may not define specific directions from which the audio is heard, but may be captured such that information representing the three-dimensional positioning of the audio is captured in the way the audio is captured. For example, ambisonic audio capture is done using an 'ambisonic microphone' comprising a number of microphone capsules. In a first order ambisonic case, the microphone is used to capture four signals W (omni-directional), X, Y and Z. During playback through a loudspeaker array for example, the signal rendered from each loudspeaker is a linear combination of the above signals which can recreate the aural scene. In one or more examples, the captured spatial audio may be considered to comprise an aural scene defined by way of spatial audio coding. For example, the audio of a scene is recorded with a microphone array. For every predetermined time frame (10 ms, for example) the microphone signals are split into frequency bands. For each frequency band a direction is determined (i.e. the direction of the sound at this frequency band). Accordingly, the audio is associated with directional information based on the spatial audio coding. During rendering the audio corresponding to the different frequencies may be played from the determined directions using vector base amplitude panning (VBAP), for example.

In one or more examples, the aural scene of the captured spatial audio content may be considered to include information representing the directions towards/locations of the audio sources obtained using a microphone array 102 of spaced microphones. The array 102 may comprise one or a plurality of microphones (not shown in FIG. 1), such as three or more. The audio captured by the microphones may be processed, using spatial audio capture techniques, to obtain both the audio itself and information indicative of the direction from which the audio was captured. For example, timing differences between receipt of corresponding audio at the different microphones may be used to derive a direction from which the audio was captured. In other examples, the location of an audio source in the scene may be tracked using tags and the like and, accordingly, the direction towards the audio source may be based on the location information and associated with the audio from the audio source. It will be appreciated, as described above, that other techniques for capturing spatial audio may be used.

By whichever technique the aural scene is defined or encoded, the recipient user may hear an aural scene which audibly replicates the original scene in terms of audio and perceived spatial three-dimensional position of said audio as if the user were in the original scene when spatial audio content was captured.

With reference to the example of FIG. 1, we disclose an apparatus 101 that, based on spatial audio content captured by a rotatable spatial audio capture microphone array 102 in a scene 103, provides for generation and, optionally, audible presentation of modified spatial audio content from the spatial audio content such that the aural scene and thus the perceived directions to audio such as audio source 105 therein are defined or "fixed" relative to the space 106 in which the "recipient" user 107 hearing the modified content is present, irrespective of any rotation of the rotatable spatial audio capture microphone array 102 when the spatial audio was captured. Thus, to explain further, the spatial audio content may comprise audio of a scene 103 that, in the example of FIG. 1, contains at least one audio source 104. The spatial audio is captured to define an aural scene including the three-dimensional arrangement of the audio in the scene. Thus, the audio of the scene and, in particular, the audio from the at least one audio source 104, may be presented with the direction from which it was captured. It will be appreciated that the captured spatial audio defining the aural scene can be presented to a recipient user using spatial audio presentation techniques (e.g. HRTF, VBA) to reproduce the aural experience in scene 103 in the space 106.

The spatial audio capture microphone array 102 may be used to capture said spatial audio to define the aural scene in scene 103. It will be appreciated that movement of the audio in the aural scene may be caused by physical movement of audio sources in the scene 103 as well as movement of the audio microphone capture array 102.

The captured spatial audio may then be provided for generation of modified spatial audio content. The generation of modified spatial audio content requires captured direction data. The captured direction data may be considered representative of rotation (and optionally movement in general) of the spatial audio microphone capture array 102 when the spatial audio was captured.

The modified spatial audio content may be provided for audible presentation to the recipient user 107 in accordance with the aural scene modified by the captured direction data. Accordingly, the audio of the at least one audio source 104 is perceived to originate from a particular direction (i.e. towards representation of the audio source 105) in space 106 in accordance with the three-dimensional arrangement defined by the aural scene, modified by captured direction data.

Thus, the apparatus 101 may also be in receipt of captured direction data along with the spatial audio content. The captured direction data is representative of the direction of a reference direction 108 of said spatial audio capture microphone array 102 relative to the scene 103 over a time during which said spatial audio content was captured. The reference direction 108 may be used as a reference to characterise the rotation of the array 102 during capture and may therefore comprise any direction that is fixed relative to the array. In this example, the reference direction 108 is shown as a straight-ahead direction. Thus, the captured direction data may be considered indicative of the direction in which the array 102 was pointing in the scene 103 while it captured the spatial audio. The captured direction data may thus use a global coordinate system to represent the rotation, relative to the earth or locally, relative to one or more fixed marker points identified in the scene 103, for example. The captured direction data allows the three-dimensional arrangement of the audio in the scene defined by the aural scene, the orientation of the aural scene defined relative to the array 102, to be decoupled from any rotation of the array 102 during capture. Accordingly, the modified spatial audio can be presented to the recipient user 107 without what may appear to be erratic changes in orientation of the spatial audio caused by rotation of the array 102 during capture.

In this example, the spatial audio capture microphone array 102 is rotatable by virtue of it being mounted on the head of a capture user 114 and, in particular, mounted to headphones 115 of the capture user 114. In general, the spatial audio capture microphone array 102 comprises a device used by the capture user 114. The array 102 may be part of a device used by the capture user and may be part of the same device that provides the headphones 115. Thus, as the capture user 114 looks around the scene 103, the array 102 will, at least, rotate. It will be appreciated that the capture user 103 may also move about the scene 103, and such motion may comprise translational motion. The rotation of the capture user's head or body and/or translational motion in the scene may be tracked by a sensor during capture of the spatial audio and be provided to the apparatus 101, 150 as captured direction data. The sensor may be part of the device that includes the array 102 and/or the headphones 115 or may be separate therefrom. In this example, the reference direction 108 of said spatial audio capture microphone array 102 relative to the scene 103 comprises a viewing direction of the user 114 located in said scene 103. It will be appreciated that the reference direction 108 need not be aligned with the viewing direction of the capture user 114. However, given that the viewing direction of the capture user 114 is desirable information to know to implement functionality in the presentation of the spatial audio to the recipient user 107, it is convenient for it to correspond. It will be appreciated that, in some embodiments, knowledge of an offset between the reference direction 108 and the viewing direction of the capture user 114 may also be used to determine the viewing direction of the capture user from the captured direction data.

The apparatus 101 and/or the apparatus 150 (described later) may comprise or be connected to a processor 101A, 150A and a memory 101B and 150B configured to execute computer program code. The apparatus 101 and/or the apparatus 150 may have only one processor 101A, 150A and one memory 101B, 150B but it will be appreciated that other embodiments may utilise more than one processor and/or more than one memory (e.g. same or different processor/memory types). Further, the apparatus 101, 150 may be an Application Specific Integrated Circuit (ASIC). It will be appreciated that the apparatus 101 and 150 are, in terms of their hardware configuration, independent of one another.

The processor 101A, 150A may be a general purpose processor dedicated to executing/processing information received from other components, such as from a content store 110 and the respective apparatuses 101, 150, in accordance with instructions stored in the form of computer program code in the memory. The output signalling generated by such operations of the processor is provided onwards to further components, such as to headphones 111 of the recipient user 107, or from the apparatus 150 to the apparatus 101.

The memory 101B, 150B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the respective processors and memories are electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

As briefly described above, the example of FIG. 1 shows the capture of spatial audio content by the spatial audio capture microphone array 102 in scene 103. The spatial audio content may be stored in content store 110 so that it may be presented to the recipient user 107 at a later time to reproduce the audio of scene 103 in space 106. It will be appreciated that the representation in FIG. 1 of a direct connection between the apparatus 101 and the content store 110 is shown for simplicity and the spatial audio content may pass through a network or any number of other content stores or servers (not shown) on its way to the apparatus 101. In one or more examples, the spatial audio content is presented live to the recipient user 107 as it is captured, e.g. provided for display instantaneously or momentarily after capture to the recipient user 107 save any processing or transmission latency. Accordingly, in one or more examples the content store 110 may represent the transient storage of spatial audio, such as at a buffer, before it is passed to the apparatus 101. The spatial audio content may be associated with visual content captured of the scene 103, such as augmented reality content or virtual reality content, for presentation to the recipient user as augmented reality or virtual reality, as appropriate.

The apparatus 101, in this example, forms part of an augmented reality apparatus 112 for presenting at least the spatial audio content via the headphones 111. In one or more other examples, the apparatus 101 may form part of a VR apparatus. In one or more examples, the apparatus 100 may be independent of an AR or VR apparatus and may be in communication with the AR or VR apparatus for providing for presentation of the spatial audio. In this example, the processor 101A and memory 101B is shared by the AR apparatus 112 and the apparatus 101, but in other examples, they may have their own processors and/or memory. The augmented reality apparatus may augment the user's appreciation of the space 106 with the spatial audio and, optionally, with one or more graphics presented via an AR visual presentation device, such as AR glasses (not shown).

The apparatus 101 and/or AR apparatus 112 may be configured to present the spatial audio to the headphones 111 of the user with spatial audio presentation techniques. The apparatus 101 and/or AR apparatus 112 may receive recipient user head tracking information from a head tracker 113.

The head tracker may be configured to determine the orientation of the recipient user's head relative to the space 106. The head tracking information may be used, by the apparatus 101 and/or AR apparatus 112, to modify the presentation of the spatial audio or to apply a modification to the HRTF or VBA to take account of head movements of the recipient user 107 such that the orientation of the aural scene remains orientated relative to the space 106 irrespective of head movements of the recipient user 107.

Figure 2:
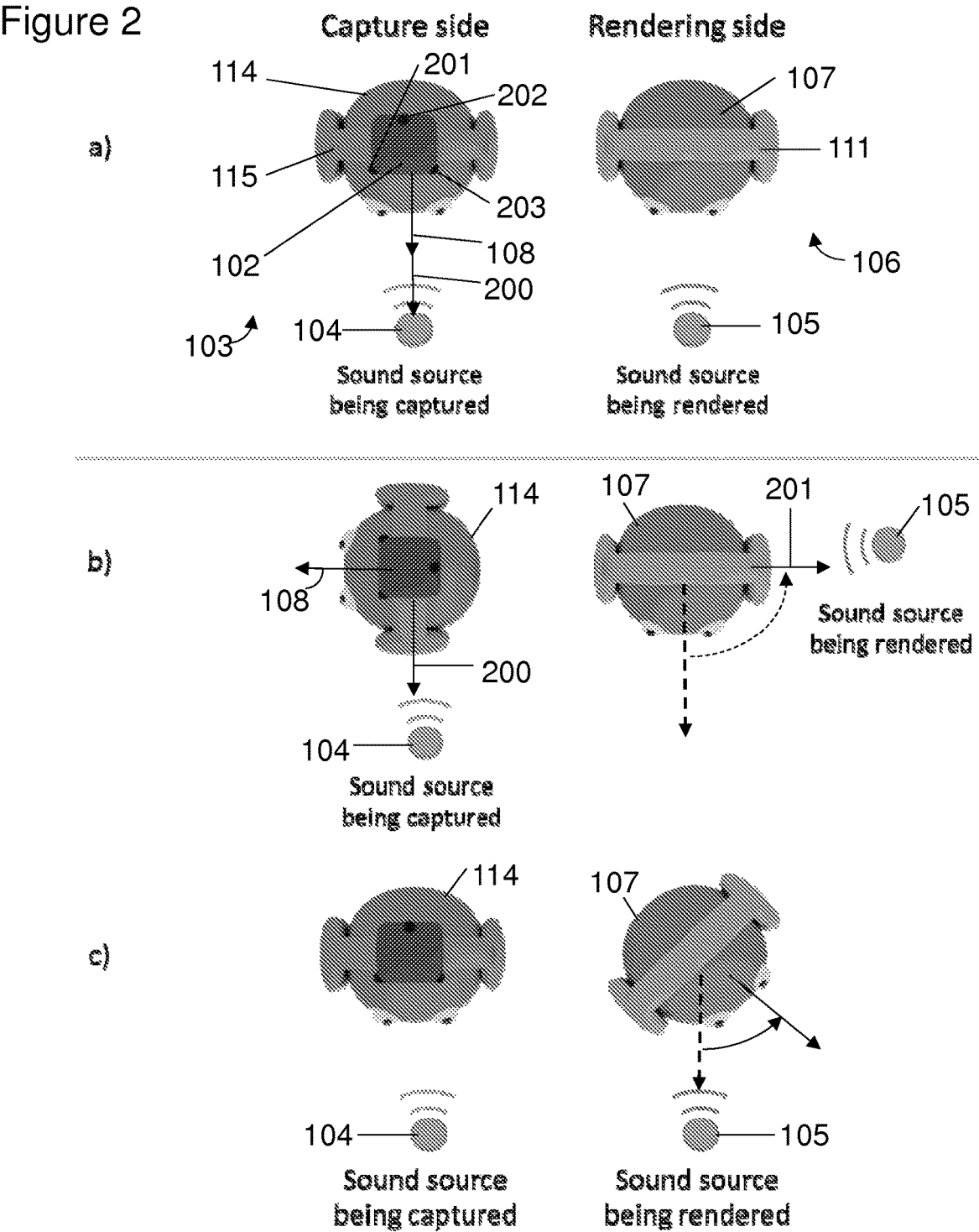
FIG. 2 shows an example of the issues of presentation of spatial audio for spatial audio capture microphone array that may rotate during capture.

The example of FIG. 2 illustrates the issues of presentation of spatial audio for captured spatial audio from the microphone array 102 that may rotate during capture. FIG. 2 shows the situation if the apparatus 101 were not used to generate modified spatial audio content.

The example of FIG. 2 presents the capture user 114 wearing headphones 115 with the spatial audio capture microphone array 102 mounted thereto, similar to as shown in FIG. 1. The array 102 includes a head tracking capability or such a capability may be provided by a different module located with or separate or remote from the array 102. The array 102 may include at least three microphones 201, 202, 203 spaced or placed in a way to capture spatial audio of the scene 103, although different set-ups or different numbers of microphones may be provided. In one or more examples a fourth microphone which may provide for determination of the direction to the audio sources in terms of azimuth and elevation.

While these examples (including examples that do use the apparatus 101) describe the capture user 114 and their array 102 as, essentially, creators of spatial audio content for the recipient user 107, they may also consume second spatial audio content themselves, such as from another user, such as recipient user 107. In such an example both the users 107, 114 may capture spatial audio content for presentation to each other. The system 100 (shown in FIG. 1), incorporating the apparatus 101 and apparatuses for presentation of the spatial audio content to one or both users may be considered to be a spatial audio based one-way or two-way communication system.

In the section of FIG. 2 labelled (a) the array 102 is capturing spatial audio of the scene 103. In this example, for simplicity, the scene 103 includes one audio source 104 and thus the aural scene of the captured spatial audio content represents the audio from the audio source 104 and its arrangement, direction or position in the scene depending on how the aural scene is defined or encoded. Accordingly, the aural scene is able to represent the audio from the audio source 104 and its arrangement in the scene i.e. in the direction 200. For ease of understanding, the audio of the audio source 104 will be described as if it were associated with a direction in the scene 103, although it will be appreciated, as described above, that the aural scene may be defined in different ways without explicit directions towards audio sources. In this example, the audio source 104 is given a direction of 0 degrees as the reference direction 108 is aligned with the direction 200.

With respect to the recipient user 107, they are presented with the spatial audio content to replicate the audio experienced in scene 103. When initially presenting the spatial audio content to the recipient user 107 the initial orientation of the aural scene, i.e. the positioning of the audio sources as presented in the spatial audio, relative to the recipient user 107 may in some embodiments be selected arbitrarily. However, in this example, the viewing direction of the capture user 114 relative to the audio sources is used to initially orientate the aural scene for presentation to the recipient user 106 so that the recipient user is presented with the audio from the audio source 104 from the same direction (e.g. in front of them). In other words, the viewing direction of the capture user at a time point during capture corresponding to the temporal beginning of the spatial audio content as it is presented to the recipient user 107 is used to initially orientate the aural scene relative to the viewing direction of the recipient user 107. Accordingly, the capture user 114 and the recipient user 107, at least initially, are looking in the same direction relative to the audio in the scene 103 and to the audio as represented by the aural scene, respectively.

In one or more examples one or both of the capture user and recipient user may provide for setting of the initial orientation of the aural scene or subsequent modification of the orientation.

Section (a) of FIG. 2 shows the audio source 104 in the scene 103, which happens to be in front of the capture user 114. Likewise, the representation of the audio source 105 in the spatial audio content presented to the recipient user 107 is also perceived to originate from a position in front of the recipient user 107.

Section (b) of FIG. 2 shows the effect on the spatial audio content, if modified spatial audio content were not generated, in the event the capture user 114 turns their head to their right. In such a situation, the direction 200 towards the audio source 104 is now 90 degrees to the left of the reference direction 108. The orientation of the aural scene defined in the captured spatial audio content is shifted by 90 degrees due to the movement of the capture user's head. Without the apparatus 101 this may have a confusing effect on the spatial audio presented to the recipient user 107. Thus, as shown in section (b) of FIG. 2, when listening to the spatial audio content, the perceived direction 201 towards the representation of the audio source 105 swings around to the left relative to the recipient user's head. As far as the recipient user is concerned and depending on the frequency and degree of the motion of the capture user, the aural scene presented to them as spatial audio may appear confusing because the capture user happened to be rotating their head during capture of the spatial audio content. For example, the recipient user may find it difficult to differentiate between movement of sound sources 104 and rotations of the capture array 102.

Section (c) of FIG. 2 illustrates the functionality of the apparatus 101 or AR apparatus 112 based on the information from the head tracker 113 (shown in FIG. 1). The head tracker 113, as mentioned above, determines the movement of the recipient user 107 and, in particular, the orientation of their head. With this head tracking information, the orientation of the aural scene may be modified such that the aural scene is stationary relative to the space 106. Accordingly, as shown in section (c), without any movement of the capture user at the time of capture, on movement of the recipient user's head to their left, the perceived direction towards the representation of the audio source 105 is configured to remain in the same location in the space 106. The presentation of the spatial audio content by the apparatus 101 or AR apparatus 112 may achieve this in various ways from modification of the spatial audio content, the application of a perceived direction modifying function that is based on the head tracking information or modification to the HRTF or VBA technique, as will be appreciated by those skilled in the art. Such a technique may be typical for presentation of spatial audio. Considering together the various head rotations of the capture user 114 (such as shown in section (b) of FIG. 2) and the recipient user 107 (such as shown in section (c) of FIG. 2), it becomes more and more confusing for the recipient user 107 to understand a spatial audio rendering that seems to compensate for his own rotation while at times it seems not to compensate for them, and furthermore at times changes very rapidly due to head movements of the capture user.

Figure 3:
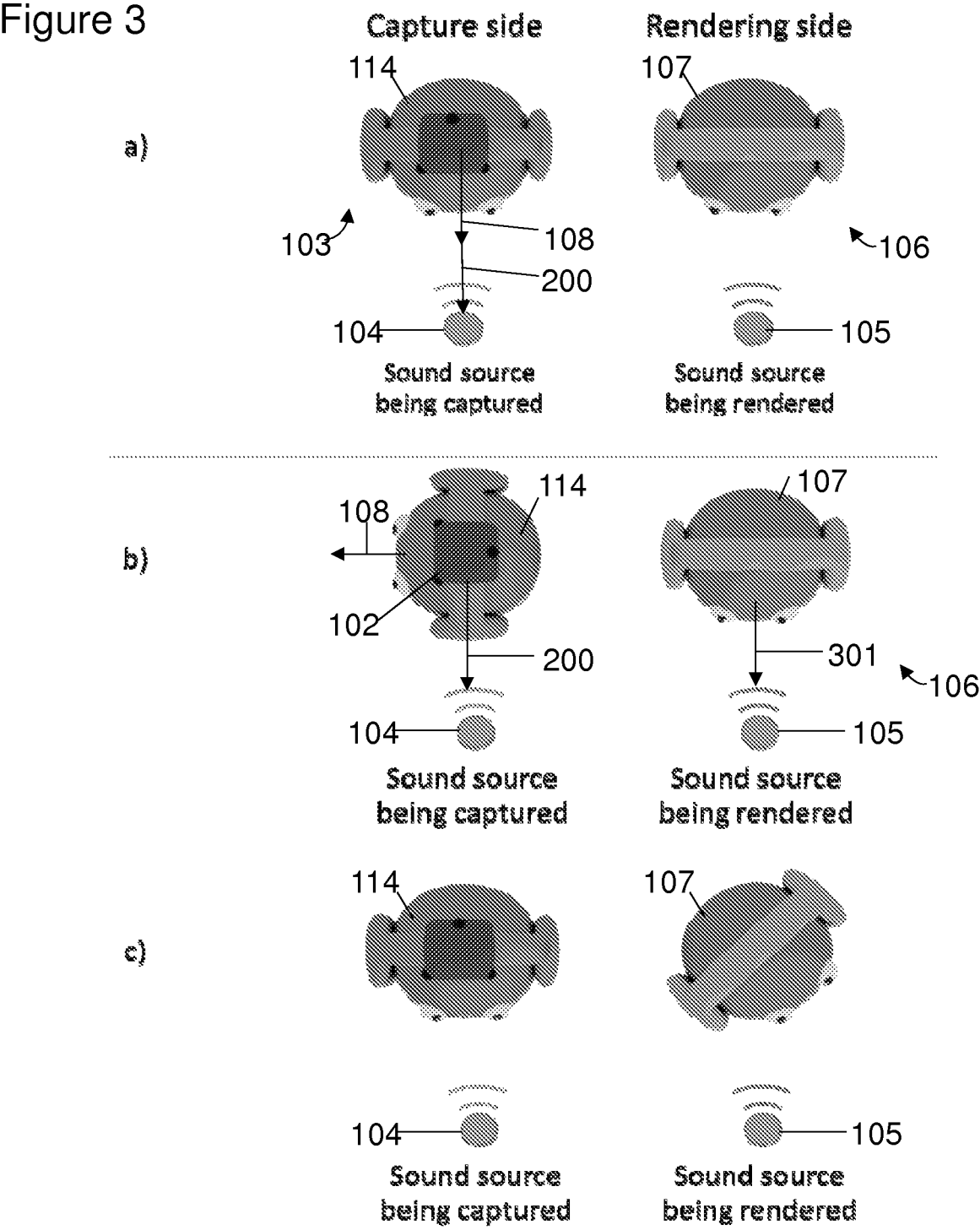
FIG. 3 shows a first example of how the apparatus may be configured to present the spatial audio based on movements of a capture user and a recipient user.

FIG. 3 shows a first example of the operation of the apparatus 101, which was not provided in FIG. 2.

Section (a) of FIG. 3 is the same as section (a) of FIG. 2. The spatial audio microphone array 102 is capturing spatial audio of the scene 103. In this example, the scene 103 includes one audio source 104 and thus the aural scene of the captured spatial audio content represents the audio from the audio source 104 and its arrangement, direction or position in the scene depending on how the aural scene is defined or encoded. Accordingly, the aural scene is able to represent the audio from the audio source 104 and its arrangement in the scene i.e. in the direction 200. In this example, the aural scene is encoded such to represent the audio from audio source 104 at a 0 degrees direction 200.

The apparatus 101 or AR apparatus 112 may be configured to generate and present the modified spatial audio content such that the orientation of the aural scene and thus the representation of the audio source 105 presented to the recipient user 107 is also perceived to originate from a position in front of the recipient user 107.

The capture direction information does not indicate any rotation or movement of the reference direction 108 and, accordingly, no modification is necessary when generating and presenting the modified spatial audio content to the recipient user 107. For recorded spatial audio content it will be appreciated that the apparatus is configured to consider the capture direction information at an equivalent elapsed time point through the spatial audio content based on the elapsed time during its presentation to the recipient user, i.e. at an equivalent time relative to the spatial audio content. For live spatial audio content that is captured and presented directly to the recipient user 107 (subject to processing and transmission latency), the capture direction information substantially corresponds to the current orientation of the array 102.

Section (b) of FIG. 3 illustrates the operation of the apparatus 101 to take account of the capture direction information when presenting the spatial audio content to the recipient user 107. In section (b) the capture user 114 turns their head to their right. In such a situation, the direction 200 towards the audio source 104 is now 90 degrees to the left of the reference direction 108.

However, the apparatus 101 is configured to provide for audible presentation of the modified spatial audio content such that the perceived direction 301 to the representation of the at least one audio source 105 is defined or "fixed" relative to the space 106. Accordingly, the aural scene, as presented to the recipient user 107 is stable irrespective of any rotation of the array 102 when the spatial audio was captured. The apparatus 101 may thus provide the technical effect that the direction 301 towards the representation of the audio source 105 relative to the space 106 is decoupled from the capture user's movement.

Thus, the turning of the capture user's head may be represented by a +90 degree shift in the direction of the reference direction 108 at a particular time in the captured direction data. The apparatus 101 may be configured to generate the modified spatial audio content by applying a +90 degree shift to the orientation of the aural scene when providing for generation and presentation of the modified spatial audio content to the recipient user 107. The presentation of the modified spatial audio content provided for by the apparatus 101 or AR apparatus 112 under the instruction of the apparatus 101 may achieve this shift in various ways. For example, the apparatus may, non-exclusively, provide for modification of the directions to audio sources as represented by the aural scene in the spatial audio content; by application of a perceived direction modifying function that is based on the captured direction data to modify how the directions of the spatial audio are presented when the spatial audio content is processed for presentation; or by modification of parameters of the HRTF or VBA spatial audio presentation techniques.

Section (c) of FIG. 3 illustrates the same functionality of the apparatus 101 or AR apparatus 112 based on the information from the head tracker 113 as shown in FIG. 2, section (c). The head tracker 113, as mentioned above, determines the movement of the recipient user 107 and, in particular, the orientation of their head. With this head tracking information, the orientation of the aural scene may be modified such that the directions to the representations of the audio sources move in an equal and opposite direction to at least rotational movement of the recipient user 107 as indicated in the head tracking information. This has the effect that the aural scene is perceived as being stationary relative to the space 106. The apparatus 101 may thus, in providing for presentation of spatial audio to the recipient user, compensate for rotation (or more generally movement) of the array 102 during capture of the spatial audio content as well as compensate for rotation (or more generally movement) of the recipient user while they are being presented with said spatial audio content.

Accordingly, as shown in section (c), without any movement of the capture user at the time of capture, on movement of the recipient user's head to their left, the perceived direction towards the representation of the audio source 105 may be modified by the apparatus 101 to remain in the same location in the space 106. The presentation of the spatial audio content by the apparatus 101 or AR apparatus 112 may achieve this in various ways from modification of the spatial audio content, the application of a perceived direction modifying function that is based on the head tracking information or modification to the HRTF or VBA technique, as will be appreciated by those skilled in the art.

Figure 4:
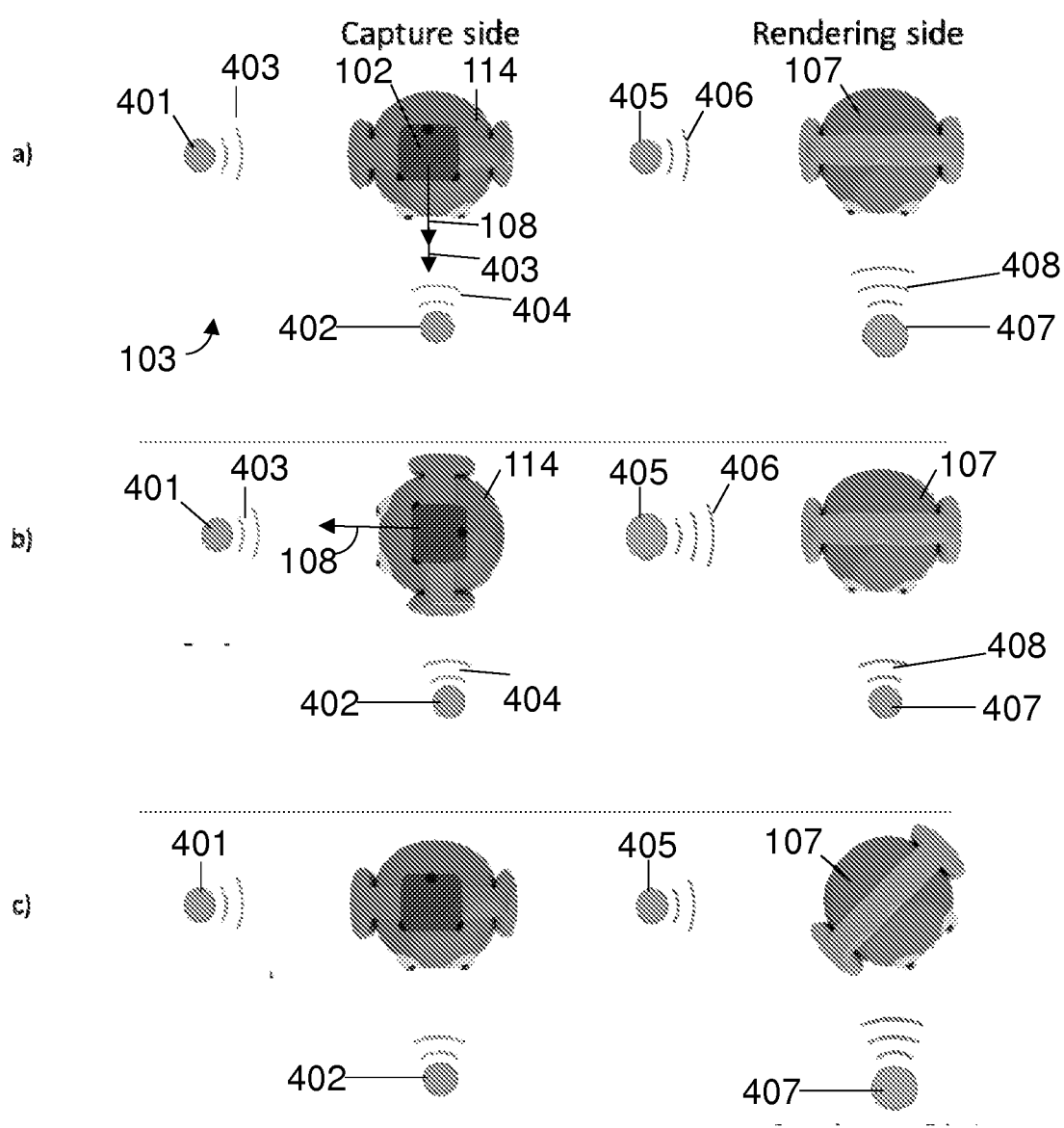
FIG. 4 shows a second example of how the apparatus may be configured to present the spatial audio based on movements of a capture user and a recipient user.

The example of FIG. 4 shows a second example of how the apparatus 101 may be configured to present the modified spatial audio based on movements of the capture user 114 (or more generally the array 102) and/or upon movement of the recipient user 107.

FIG. 4 illustrates an example way of providing an aural focus based on the orientation of the spatial audio capture array and, in particular, based on the viewing direction of the capture user 114. The focus may be achieved by use of a spatially localised audio effect. This may be used to indicate to the recipient user 107 where in the scene 103 and, for example, which audio sources the capture user 114 was looking towards, when the spatial audio content was captured. The spatially localised audio effect may be applied to a subset of the audio of the aural scene of the modified spatial audio content that is associated with a focus direction. The focus direction may be based on the direction the capture user was looking when the spatial audio content was captured and may thus be equivalent to the reference direction 108. The focus direction may comprise a narrow, particular direction or a broader, bounded range of directions, such as a continuous range of directions. Whether the spatially localised audio effect is applied to the audio of a particular region of the aural scene, in a specific direction or to audio from specific audio sources may depend on how the spatial audio content is structured and/or what level of detail is provided by the aural scene as recorded in the spatial audio content. For example, in case of an ambisonics representation, as will be understood by those skilled in the art, the order of the higher-order ambisonics (HOA) will determine the accuracy of the spatial directivity perceived by the user.

FIG. 4, section (a) illustrates a scene 103 containing a first audio source 401 and a second audio source 402. The audio of the scene 103 is captured as spatial audio by the spatial audio capture microphone array 102, which again is head mounted on the capture user 114. The reference direction 108 of the array 102 is aligned with or has a known relationship with the viewing direction 403 of the user. Thus, the viewing direction of the capture user 114 is known to the apparatus 101 by way of the captured direction data.

In the scene 103, the loudness of the first and second audio sources 401 is substantially similar as illustrated by sound wave icons 403, 404 having two "bars". Looking now at the recipient user 107 being presented with the modified spatial audio content to reproduce the audio of the scene 103, the representation of the first audio source 405 is presented with a particular loudness shown by the "two bar" icon 406. However, the representation of the second audio source 407 is presented with a greater loudness, represented by the "three bar" icon 408 because the viewing direction of the capture user 114, known to the apparatus 101 based on the captured direction data, is toward the second audio source 407. Thus, information indicative of the focus or viewing direction of the capture user 114 at the equivalent elapsed time relative to the spatial audio content can be conveyed to the recipient user 107 using the spatially localised audio effect. If the spatial audio content is presented live, the spatially localised audio effect is indicative of the current focus or viewing direction of the capture user 114.

Accordingly, the apparatus 101 may be caused to provide for application of the spatially localised audio effect to a spatially defined selection of the audio of the modified spatial audio content based on the reference direction at the time when the spatial audio was captured.

The localised audio effect may be configured to draw the attention of the recipient user 107 to the audio sources that were or are focussed upon by the capture user 114. In one or more examples, the localised audio effect is configured to cause one or more of
i) an increase in loudness;
ii) a modification in loudness of one or more frequency components; and
iii) a modification in frequency of one or more frequency components;
of the spatially defined selection of the audio relative to a remainder of the audio presented to the recipient user 107.

The localised audio effect may be any of the following examples or something different. In one or more examples, the bass, mid-tones or treble of the audio in the localized area may be increased or decreased by the application of the spatially localised audio effect. In one or more examples, the pitch of the audio in the localized area may be increased or decreased by the application of the spatially localised audio effect. A time-varying localised audio effect may be applied, which may comprise a pulsing effect or temporally continuous or discontinuous changes to the audio in the localized area.

FIG. 4 section (b) relative to section (a) shows the change in orientation of the capture user. FIG. 4, section (b) shows, similar to FIG. 3(b), how rotation of the head of the capture user 114 from focussing on the second audio source 402 to focussing on the first audio source 401, is compensated for by the apparatus 101 by generation of the modified spatial audio content when providing for presentation of the aural scene to the recipient user 107. Thus, the representation of the second audio source 407 is presented such that it is perceived to remain in front of the recipient user 107 and the representation of the first audio source 405 is presented such that it is perceived to remain to the right of the recipient user 107.

However, in FIG. 4(b), based on the change in reference direction 108 of the array during the capture of spatial audio, which in this head-mounted array 102 embodiment is indicative of a change in viewing direction of the capture user 114, the apparatus may be configured to provide for repositioning of the localised audio effect as applied to the modified spatial audio content in accordance with the change in reference direction. Thus, the localised audio effect is removed from the representation of the second audio source 407 and is applied to the audio of the representation of the first audio source 405. Accordingly, independent of any change in the loudness of the audio from the audio sources 401, 402, the sound wave icon 408 illustrates a decrease in loudness of audio from the representation of the second audio source 407 and the sound wave icon 406 illustrates an increase in loudness of audio from the representation of the first audio source 405, by virtue of the repositioning of the localised audio effect. Thus, the use of a localised audio effect based on the reference direction of the array, and, in particular, the viewing direction of the capture user 114 (the user who's audio scene is captured) may provide a convenient and intuitive indication to the recipient user 107 of what may be interesting in the aural scene based on the actions of the capture user. If the AR apparatus 112 (or VR apparatus in some embodiments) is configured to show visual imagery along with the spatial audio content, the localised audio effect provided by the apparatus 101 may provide an aural cue to the recipient user 114 to look in the direction in which the localised audio effect is applied as they may see as well as hear something interesting.

Section (c) of FIG. 4 illustrates the same functionality of the apparatus 101 or AR apparatus 112 based on the information from the head tracker 113 as shown in FIG. 3, section (c). The head tracker 113, as mentioned above, determines the movement of the recipient user 107 and, in particular, the orientation of their head. With this head tracking information, the orientation of the aural scene may be modified such that the directions to the representations of the audio sources move in an equal and opposite direction to at least rotational movement of the recipient user 107 as indicated in the head tracking information. This has the effect that the aural scene is perceived as being stationary relative to the space 106.

In one or more examples, the application of the spatially localised audio effect may be based on the captured direction data (representing movement of the capture user 114) and the head tracking information (representing movement of the recipient user 107). As described above, the localized audio effect may have the effect of drawing the attention of the recipient user 107 towards the "same" audio source (or, more generally, a spatially defined part of the aural scene) as viewed by the capture user when the spatial audio content was captured. However, if the recipient user is already looking towards the same audio source, in some examples, it may not be necessary to provide for application of the localized spatial audio effect. Thus, the apparatus 101 may be configured to apply the spatially localised audio effect based on the direction indicated in the reference direction data but only when the head tracking information indicates that the recipient user is not looking in a corresponding direction relative to the aural scene.

Thus, in one or more embodiments, the provision of the spatially localised audio effect is further based on there being a misalignment, above a misalignment threshold, between the reference direction (defined in the captured direction data, for example) and a current user-viewing-direction of the recipient user 107 (defined in the head tracking information, for example). The current user-viewing-direction comprises the direction in which the recipient user is looking relative to the aural scene and, in some examples, may comprise the direction relative to the position of the at least one audio source presented to them as spatial audio, i.e. audio sources 405, 407. The misalignment threshold may control how close the viewing direction of the recipient user needs to be to the viewing direction of the capture user when the spatial audio was captured for the localised audio effect to be applied or not applied. The misalignment threshold may be, e.g., less than 2, 5, 10, 15, 20, 40, 45, 50, 60 degrees. In one or more examples, the misalignment threshold may be defined in terms of the width of the current field of view of the recipient user such that if the audio source focussed on by the capture user is within the current field of view of the recipient user, the spatially localised audio effect is not applied, but if it is outside the current field of view of the recipient user, the spatially localised audio effect is applied.

In one or more examples, the provision of the spatially localised audio effect is further based on the physical configuration of the scene. For example, while the spatial audio captured by the microphone array 102 may be of audio from audio sources present in the scene, this may not be representative of audio sources that are actually visible to the capture user (or in the reference direction of the array). For example, a wall may block a view of the audio source, but the audio may still be captured. Accordingly, the apparatus 101 may, based on scene configuration data, provide for determination of whether or not the microphone array (or capture user) has an obstructed or unobstructed view of the at least one audio source and:
  i) if the view is unobstructed, provide for application of a first spatially localised audio effect to the audio of the aural scene in a region based on the reference direction at the time when the spatial audio was captured; and
  ii) if the view is obstructed, provide for application of a second spatially localised audio effect to the audio of the aural scene in a region based on the reference direction at the time when the spatial audio was captured, the second spatially localised audio effect different to the first spatially localised audio effect.

The first and second spatially localised audio effects may thus provide an audible indicator for the recipient user. Thus, the recipient user may be provided with an audible indication of where the capture user is/was looking and whether their view of the audio source in direction they are looking is obstructed or unobstructed. It will be appreciated that one of the first and second spatially localised audio effect may have no effect on the audio while the other does, to provide the distinction.

Accordingly, the spatially localised audio effect applied, when viewing directions of the capture user and recipient user are in common, may be different depending on the configuration of the scene and, in particular, whether there is an obstructed or unobstructed view of the audio source for the capture user.

The scene configuration data may be associated with the spatial audio content, such as comprising metadata. The scene configuration data may be captured by a sensor located in the scene. The sensor may comprise a camera or a room-geometry mapping device. The information from the sensor may be used, along with the location of the point of view of the capture user and, optionally, the location of the audio sources, to determine which audio sources are visible to the capture user. The scene configuration data is thus representative of the physical configuration of the scene at least between the capture user and each audio source in the scene to indicate whether the capture user has an obstructed or unobstructed view of the at least one audio source.

The second spatially localised audio effect may be different to the first spatially localised audio effect in terms of one or more of:
  i) a difference in the volume difference applied to the audio in the localised area relative to the audio outside the localised area;
  ii) a difference in the loudness or frequency components applied to the audio in the localised area relative to the audio outside the localised area in terms of an effect that provides a modification to the loudness of one or more frequency components; and
  iii) a difference in the frequency modification applied to the audio in the localised area relative to the audio outside the localised area in terms of an effect that provides modification to the frequency of one or more frequency components.

In one or more examples, it may be desirable to provide an indication to one or both of the capture user 102 and recipient user that the recipient user 107 is looking in the same direction relative to the aural scene as the capture user when the spatial audio content was captured. More generally, the apparatus 101 may provide an indication when the recipient user is looking in the same direction relative to the aural scene as the reference direction of the array when the spatial audio was captured. For example, when the spatial audio capture is provided live from the capture user to the recipient user, the indication may inform one or both users that they are looking in the same direction relative to the aural scene. This may be useful if the apparatus forms part of a communication system configured to provide a communication link between a device used by the capture user and a device used by the recipient user. Thus, the apparatus may be configured such that based on the captured direction data, which may indicate where the recipient user is looking by way of the reference direction, and a current user-viewing-direction comprising the current direction in which the recipient user is looking relative to the aural scene presented to them, and when the reference direction is currently aligned, within a threshold distance, with the current user-viewing direction, provide for presentation of a view-direction-aligned indicator to the recipient user and/or capture user.

The presentation of the view-direction-aligned indicator may comprise a graphical, audible or haptic indication indicative of the recipient user looking in the same direction when viewing the spatial audio content as the reference direction of the spatial audio capture microphone array when the spatial audio content was captured. The apparatus 101 may provide signalling to the AR apparatus 112 to display a graphical view-direction-aligned indicator in an augmented reality view provided to the recipient user 107. In other examples, the apparatus 101 may be associated with a VR apparatus and the apparatus 101 may provide signalling to the VR apparatus 112 to display a graphical view-direction-aligned indicator overlaid in the virtual reality view provided to the recipient user 107. In some examples, the apparatus 101 may provide signalling to cause the presentation of a view-direction-aligned indicator to the capture user 114 using a AR or VR apparatus (not shown) used by the capture user 114. The graphical view-direction-aligned indicator may comprise an icon, animation, or modification to the colour or shape of one or more graphics already presented to the one or both users.

In one or more examples, particularly when the spatial audio content is presented live to the recipient user, the identification of when the recipient user 107 is looking in the same direction relative to the aural scene as the capture user 114 may be used for a variety of functions. The "same direction" may be determined as being a viewing direction in common within a threshold, such as within a few degrees (e.g. 5, 10, 15, 20, 30, 45 degrees) of exactly the same direction.

In one or more examples, the apparatus 101 may use the captured direction data to determine the reference direction of said spatial audio capture microphone array 102 relative to the scene 103, which may comprise a viewing direction of the capture user located in said scene. The apparatus 101 may determine the current user-viewing-direction of the recipient user 107 from the head tracking information. If the viewing direction of the capture user 114 relative to the scene aligns, within a threshold, with the current user-viewing-direction of the recipient user relative to the aural scene, the apparatus may conclude that the capture user 114 and the recipient user 107 are looking in the same direction relative to the position of the same audio e.g. relative to the audio of scene 103 and as represented by the aural scene. On the basis that such a condition is met, the apparatus 101 may be configured to provide for opening of a communication channel between the capture user and the recipient user to enable direct audio communication therebetween. Thus, the apparatus may be configured to provide signalling that enables at least audio communication from the capture user 114 to the recipient user 107 and vice versa. The capture user 114 and the recipient user 107 may be provided with microphones and headphones/speakers to enable said communication. Thus, the apparatus 101 may open the communication channel if the capture user and recipient user are looking the same direction relative to the scene around them or the aural scene presented to them respectively.

The apparatus may provide of a separate communications microphone from the array and separate channel for providing voice communication from user to user. For example, the apparatus may be configured to remove the user's voice from the spatial audio content and only provide the voice audio from the communications microphone to the other user.

The opening of the communication channel may be indicated to one or both users 107, 114. The apparatus 101 may be caused to provide for presentation of one or more communication-channel-open indicators to inform the corresponding one or both of the recipient user and the capture user of the open communication channel.

The communication-channel-open indicator may comprise a graphical indicator provided to a respective display viewable by the one or both of the recipient user and the capture user, such as an icon, animation, or modification to the colour or shape of one or more graphics already presented. In one or more examples the communication-channel-open indicator comprises an aural indicator, such as a tone, sound effect or modification to audio already presented to the user. In one or more examples, the communication-channel-open indicator comprises a haptic indicator, such as a vibration pulse(s), provided to a respective haptic feedback module, such as the user's mobile phone or part of the AR/VR apparatus.

When considering the use of the apparatus 101 as a communication system, in one or more examples, there may be a plurality of capture users available to communicate with the recipient user. The modified spatial audio content may thus comprise modified spatial audio content from a plurality of rotatable spatial audio capture microphone arrays, each array associated with a respective one of a plurality of capture users. The plurality of capture users may or may not be located in the same scene. The spatial audio content presented to the recipient user 107 may comprise the spatial audio captured by one of the arrays of the capture users or may comprise an amalgamation of the audio from the scene 103 captured by a plurality of or all of the arrays of the capture users.

The apparatus 101 may be caused, based on the viewing direction of any one of the plurality of capture users relative to the aural scene aligning, within a threshold, with the current user-viewing-direction of the recipient user, to provide for opening of a communication channel between the said any one of the plurality of capture users and the recipient user to enable audio communication therebetween. Thus, the alignment of the viewing direction of the recipient user relative to the aural scene they are presented with and the reference direction relative to the audio of the scene of the one or more users provides for communication between those users. The alignment of the viewing directions may thus act as a selector for determining with which of the capture users the recipient user communicates on a two-way basis. The apparatus may provide for simultaneous two-way communication, similar to an audio conference, between the recipient user and a plurality of capture users.

The embodiments described above primarily although not exclusively consider the situation where the recipient user 107 is presented with modified spatial audio content in which the aural scene is repositioned based on recipient user rotational movement over three degrees of freedom. Thus, the orientation of the aural scene is presented to compensate for rotation of the recipient user about a fixed point of view. However, the principles disclosed herein also apply to a recipient user that has six degrees of freedom and can rotate and also move about the space 106. The movement of the recipient user about the space 106 may be provided by a controller to virtually move relative to the aural scene. The movement of the recipient user about the space may comprise physically movement about the space which may be tracked. Based on translation of the recipient user about the space, either physically or virtually, the apparatus may provide for modification of the aural scene and thus the directions from which the audio is perceived to originate to take account of the new listening position.

In one or more examples, the spatial audio capture microphone array may be rotatable and translatable in the scene such that the array has six degrees of freedom in said scene. Similar to rotation of the array while capturing spatial audio, the translation of the array may also cause confusion to the recipient user, as they will hear a moving aural scene. Thus, the apparatus 101 may receive capture location data representative of at least translational movement of the microphone array about the scene during capture of the spatial audio content. The captured direction data may be incorporated with the capture location data.

The apparatus 101 may be caused to provide for generation and, optionally, audible presentation, of the modified spatial audio content to the recipient user, as spatial audio.

The modified spatial audio content having an aural scene that is decoupled from both occurrences of translational movement of the array and occurrences of rotation of the array that occurred during capture of the spatial audio content for presentation to the recipient user relative to a space in which the recipient user is located by virtue of modification of a position of the aural scene and the orientation of the aural scene using the captured location data and the captured direction data. Thus, based on the capture location data, which defines the translational movement of the array in the scene during capture of the spatial audio content, the apparatus provides for presentation of the spatial audio such that aural scene is defined/presented relative to a space in which the recipient user is located irrespective of any translational motion of said microphone array when the spatial audio was captured.

In the above examples, the apparatus 101 is located with the apparatus used by the recipient user to experience the spatial audio content. Thus, aural scene is decoupled from the motion of the microphone array 102 in creation of the modified spatial audio content and then it is provided for presentation to the recipient user. However, in one or more examples, and with reference to FIG. 1, the captured spatial audio content may be pre-processed to generate the modified spatial audio content, which can subsequently be provided to the AR apparatus or other spatial audio presentation apparatus. The apparatus 150 may be configured to generate modified spatial audio content, rather than generate and present, wherein at least the orientation of aural scene defined in the modified spatial audio content is modified such that the aural scene may be decoupled form movement of the array such as by being defined relative to a coordinate system independent of the rotatable spatial audio content capture microphone array, which may be subject to rotation and/or translation.

Accordingly, the apparatus 150 may be configured to receive captured spatial audio content defining an aural scene comprising the audio of a scene surrounding the spatial audio capture microphone array defined such that the three-dimensional arrangement of the audio in the scene is audibly presentable to a recipient user, an orientation of the aural scene defined relative to the rotatable spatial audio capture microphone array at the time of audio capture. Further, the captured spatial audio content may include captured direction data, the captured direction data representative of the direction of a reference direction of said spatial audio capture microphone array relative to the scene over a time during which said spatial audio content was captured. It will be appreciated that given the orientation of the aural scene is defined relative to the microphone array and, with the captured direction data, that potentially time-variable orientation can be translated into directions defined relative to the scene or otherwise decoupled from rotation/movement of the spatial audio capture microphone array.

Accordingly the apparatus 150 may be caused to provide for generation of modified spatial audio content from the captured spatial audio content for presentation to the recipient user, wherein the orientation of the aural scene is translated from being relative to the reference direction 108 of the spatial audio capture microphone array 102 to being relative to the scene 103 using the captured direction data to thereby define the three-dimensional arrangement of the audio in the scene irrespective of any rotation of the rotatable spatial audio capture microphone array during the time when the captured spatial audio was captured.

In one or more examples, the modified spatial audio content may simply be provided to an AR or VR apparatus 112 for presentation to the recipient user as spatial audio oriented in said space 106. In one or more examples, the apparatus 150 may provide said modified spatial audio content along with the captured direction data such that the apparatus 101 may provide for the application of the spatially localised audio effect and/or two-way communication, as described above.

If the apparatus 150 is configured to "decouple" the captured spatial audio content from motion of the array, then, in one or more examples, the apparatus 101 may be configured to present the modified spatial audio content. Accordingly the apparatus 101 may be cause to perform the following: based on modified spatial audio content, the modified spatial audio content comprising audio captured of a scene by an at least rotatable spatial audio capture microphone array, the modified spatial audio content defining an aural scene comprising the audio of the scene defined such that the three-dimensional arrangement of the audio in the scene is audibly presentable to a recipient user, the aural scene decoupled from any rotation of the rotatable spatial audio capture microphone array that occurred during capture of the spatial audio content for presentation to the recipient user;

provide for audible presentation of the modified spatial audio content to the recipient user as spatial audio, wherein the orientation of the aural scene of the modified spatial audio content is presented relative to the space in which the recipient user is located irrespective of any rotation of the rotatable spatial audio capture microphone array when the spatial audio was captured.

Figure 5:
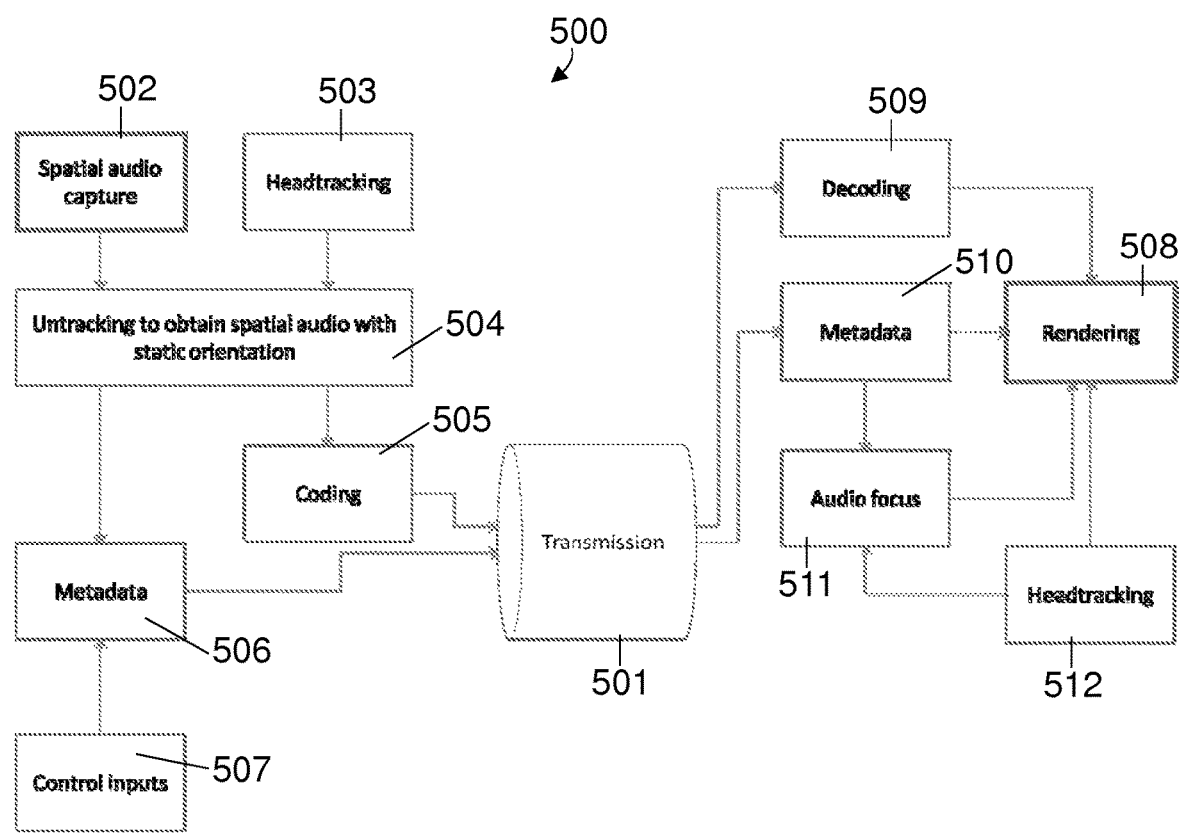
FIG. 5 shows a data flow overview of the capture of spatial audio and the presentation of spatial audio.

FIG. 5 shows a system overview 500. A transmission block 501 illustrates the transmission of the spatial audio content between the array 102 or capture user 114 and the apparatus 101 or the recipient user 107. Block 502 shows the spatial audio capture by the array 102. Block 503 shows head-tracking of the capture user 114 to provide the captured direction data. Block 504 show the action of apparatus 150. The spatial audio content is encoded at block 505. The captured direction data is provided as metadata at block 506. Other control inputs, such as user-input of the capture user 114 may be provided and incorporated in the metadata at block 507. The presentation of the modified spatial audio content to the recipient user 107 is shown as rendering block 508. The rendering of the spatial audio, including definition of the directions from which the audio is to be perceived, is based on the decoded spatial audio content from decoding block 509, the capture direction metadata from metadata block 510, an audio focus block 511 to determine the application of the spatially localised audio effect and the movement of the recipient user's head from the head tracking block 512.

Figure 6:
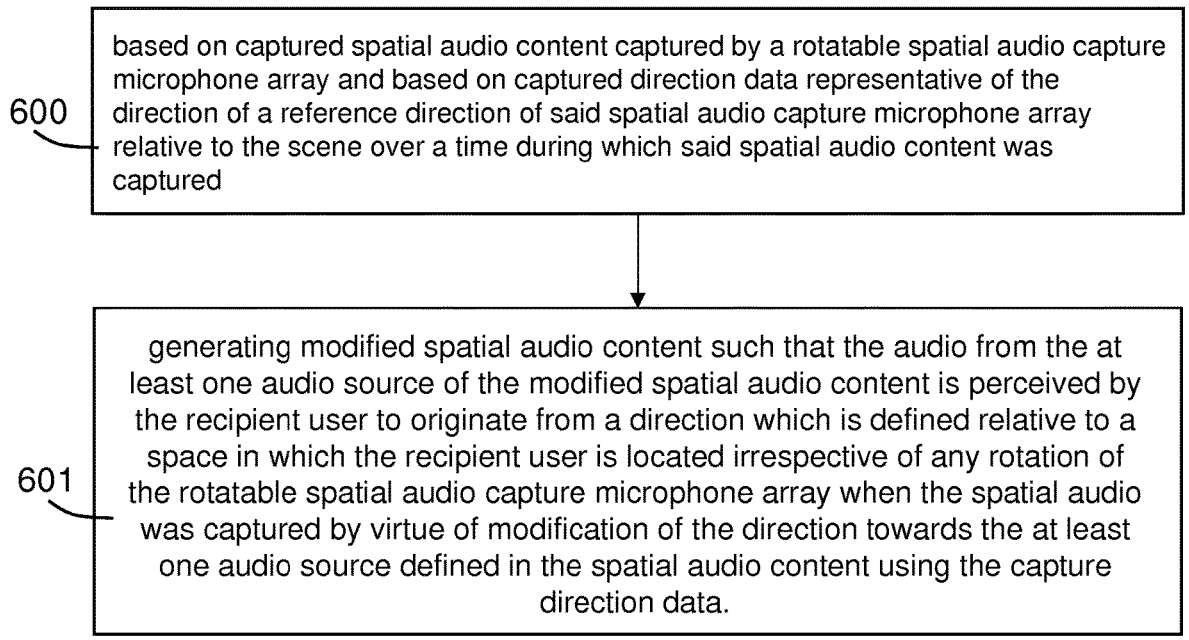
FIG. 6 shows a flowchart illustrating an example method.

FIG. 6 shows a flow diagram illustrating the steps of,
based on 600 captured spatial audio content captured by a rotatable spatial audio capture microphone array, the captured spatial audio content defining an aural scene comprising the audio of a scene surrounding the spatial audio capture microphone array defined such that the three-dimensional arrangement of the audio in the scene is audibly presentable to a recipient user, an orientation of the aural scene defined relative to the rotatable spatial audio capture microphone array at the time of audio capture, and based on captured direction data associated with the spatial audio content and representative of the direction of a reference direction of said spatial audio capture microphone array relative to the scene over a time during which said spatial audio content was captured;

generating 601 modified spatial audio content in which the aural scene is decoupled from any rotation of the rotatable spatial audio capture microphone array that occurred during capture of the spatial audio content for presentation to the recipient user relative to a space in which the recipient user is located by virtue of modification of the orientation of the aural scene using the captured direction data.

Figure 7:
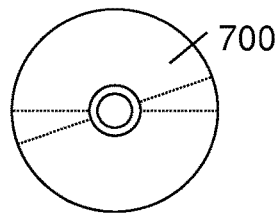
FIG. 7 shows a computer readable medium.

FIG. 7 illustrates schematically a computer/processor readable medium 700 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising
   at least one processor; and at least one memory including computer program code;
the at least one memory and the computer program code configured to, with the at least one processor, cause the apparatus at least to perform:
use
captured spatial audio content captured by a rotatable spatial audio capture microphone array, the captured spatial audio content defining an aural scene comprising the audio of a scene surrounding the spatial audio capture microphone array defined such that the three-dimensional arrangement of the audio in the scene is audibly presentable to a recipient user, an orientation of the aural scene defined relative to the rotatable spatial audio capture microphone array at the time of audio capture, and
captured direction data associated with the spatial audio content and representative of the direction of a reference direction of the spatial audio capture microphone array relative to the scene over a time during which the spatial audio content was captured;
to generate modified spatial audio content in which the aural scene is decoupled from any rotation of the rotatable spatial audio capture microphone array that occurred during capture of the spatial audio content for presentation to the recipient user relative to a space in which the recipient user is located by virtue of modification of the orientation of the aural scene using the captured direction data.

2. The apparatus of claim 1, wherein the apparatus is caused to provide for presentation of the modified spatial audio content as spatial audio to the recipient user and provide for application of a spatially localised audio effect to the audio of the aural scene based on the reference direction at the time when the spatial audio content was captured to indicate where in the aural scene the reference direction was pointing when the captured spatial audio content was captured, the localised audio effect configured to cause one or more of:
an increase in loudness;
a modification in loudness of one or more frequency components; or
a modification in frequency of one or more frequency components;
relative to a remainder of the audio presented to the recipient user.

3. The apparatus of claim 2, wherein the provision of the spatially localised audio effect is further based on there being a misalignment, above a misalignment threshold, between the reference direction and a current user-viewing-direction comprising the current direction in which the recipient user is looking relative to the aural scene presented to them as spatial audio.

4. The apparatus of claim 1, wherein the apparatus is caused to provide for presentation of the modified spatial audio content as spatial audio to the recipient user and based on the captured direction data and a current user-viewing-direction comprising the current direction in which the recipient user is looking relative to the aural scene presented to them as spatial audio, and wherein the current user-viewing direction is currently aligned, within a threshold distance, with the reference direction;
provide for presentation of a view-direction-aligned indicator to the recipient user, the presentation of the view-direction-aligned indicator thereby indicative of the recipient user looking in the same direction relative to the aural scene as the reference direction of the spatial audio capture microphone array relative to the scene when the spatial audio content was captured.

5. The apparatus of claim 1, wherein the reference direction of the spatial audio capture microphone array relative to the scene comprises a viewing direction of a user located in the scene, termed a capture user, at the time of capture of the captured spatial audio content, the spatial audio capture microphone array rotatable in accordance with the viewing direction of the capture user.

6. The apparatus of claim 1, wherein the at least rotatable spatial audio capture microphone array is configured to be mounted to a capture user's head.

7. The apparatus of claim 1, wherein the spatial audio content is presented live to the recipient user.

8. The apparatus of claim 1, wherein the apparatus is caused to provide for presentation of the modified spatial audio content as spatial audio to the recipient user and the reference direction of the spatial audio capture microphone array relative to the scene comprises a viewing direction of a user located in the scene, termed a capture user, at the time of capture of the captured spatial audio content and the spatial audio content is presented live to the recipient user; and
based on the viewing direction of the capture user relative to the scene aligning, within a threshold, with a current user-viewing-direction of the recipient user relative to the aural scene, such that the capture user and the recipient user have substantially the same orientation relative to the scene and the aural scene respectively;
provide for opening of a communication channel between devices of the capture user and the recipient user to enable direct audio communication therebetween.

9. The apparatus of claim 8, wherein based on the opening of the communication channel, the apparatus is caused to provide for presentation of one or more communication-channel-open indicators to inform one or both of the recipient user or the capture user of the open communication channel.

10. The apparatus of claim 8, wherein the captured spatial audio content comprises spatial audio content from a plurality of rotatable spatial audio capture microphone arrays, each array associated with a respective one of a plurality of capture users, the plurality of capture users located in the same scene, and the aural scene presented to the recipient user is a combination of the aural scenes captured by the plurality of rotatable spatial audio capture microphone arrays wherein;
based on the viewing direction of any one of the plurality of capture users relative to the scene aligning, within a threshold, with a current user-viewing-direction of the recipient user, the current user-viewing-direction comprising the current direction in which the recipient user is looking relative to the aural scene, such that the one capture user and the recipient user hear the same audio in front of them;
provide for opening of a communication channel between the any one of the plurality of capture users and the recipient user to enable direct audio communication therebetween.

11. The apparatus of claim 2, wherein the provision of the spatially localised audio effect is further based on scene configuration data, the scene configuration data captured by a sensor located in the scene and representative of the physical configuration of the scene at least between the spatial audio capture microphone array and one or more audio sources in the scene to indicate whether the spatial audio capture microphone array has an obstructed or unobstructed view of the one or more audio sources; and wherein;
the apparatus is caused to provide for application of a first spatially localised audio effect to the audio of the aural scene of the modified captured spatial audio based on the reference direction at the time when the spatial audio was captured and if the one or more audio sources are unobstructed based on the scene configuration data; and
the apparatus is caused to provide for application of a second spatially localised audio effect to the audio of the aural scene of the modified captured spatial audio based on the reference direction at the time when the spatial audio was captured and if the one or more audio sources are obstructed based on the scene configuration data, the second spatially localised audio effect different to the first spatially localised audio effect.

12. The apparatus of claim 1, wherein the spatial audio capture microphone array is rotatable and translatable in the scene such that the array has six degrees of freedom in the scene and, based on captured location data defining translational movement of the array in the scene during capture of the spatial audio content, the apparatus is caused to generate the modified spatial audio content in which the aural scene is decoupled from both any translational movement of the array and any rotation of the array that occurred during capture of the spatial audio content for presentation to the recipient user relative to a space in which the recipient user is located by virtue of modification of a position of the aural scene and the orientation of the aural scene using the captured location data and captured direction data.

13. The apparatus of claim 1, wherein the apparatus is caused to provide for presentation of the modified spatial audio content as spatial audio to the recipient user.

14. A method, the method comprising:
based on captured spatial audio content captured by a rotatable spatial audio capture microphone array, the captured spatial audio content defining an aural scene comprising the audio of a scene surrounding the spatial audio capture microphone array defined such that the three-dimensional arrangement of the audio in the scene is audibly presentable to a recipient user, an orientation of the aural scene defined relative to the rotatable spatial audio capture microphone array at the time of audio capture, and
based on captured direction data associated with the spatial audio content and representative of the direction of a reference direction of the spatial audio capture microphone array relative to the scene over a time during which the spatial audio content was captured;
generating modified spatial audio content in which the aural scene is decoupled from any rotation of the rotatable spatial audio capture microphone array that occurred during capture of the spatial audio content for presentation to the recipient user relative to a space in which the recipient user is located by virtue of modification of the orientation of the aural scene using the captured direction data.

15. The method of claim 14, comprising causing to provide for presentation of the modified spatial audio content as spatial audio to the recipient user and provide for application of a spatially localised audio effect to the audio of the aural scene based on the reference direction at the time when the spatial audio content was captured to indicate where in the aural scene the reference direction was pointing when the captured spatial audio content was captured, the localised audio effect configured to cause one or more of:
an increase in loudness;
a modification in loudness of one or more frequency components; or
a modification in frequency of one or more frequency components;
relative to a remainder of the audio presented to the recipient user.

16. The method of claim 15, wherein the provision of the spatially localised audio effect is further based on there being a misalignment, above a misalignment threshold, between the reference direction and a current user-viewing-direction comprising the current direction in which the recipient user is looking relative to the aural scene presented to them as spatial audio.

17. The method of claim 14, comprising causing to provide for presentation of the modified spatial audio content as spatial audio to the recipient user and based on the captured direction data and a current user-viewing-direction comprising the current direction in which the recipient user is looking relative to the aural scene presented to them as spatial audio, and wherein the current user-viewing direction is currently aligned, within a threshold distance, with the reference direction;
causing to provide for presentation of a view-direction-aligned indicator to the recipient user, the presentation of the view-direction-aligned indicator thereby indicative of the recipient user looking in the same direction relative to the aural scene as the reference direction of the spatial audio capture microphone array relative to the scene when the spatial audio content was captured.

18. The method of claim 14, wherein the reference direction of the spatial audio capture microphone array relative to the scene comprises a viewing direction of a user located in the scene, termed a capture user, at the time of capture of the captured spatial audio content, the spatial audio capture microphone array rotatable in accordance with the viewing direction of the capture user.

19. The method of claim 14, wherein the spatial audio content is presented live to the recipient user.

20. A non-transitory computer readable medium comprising program instructions stored thereon for performing at least the following:
use
captured spatial audio content captured by a rotatable spatial audio capture microphone array, the captured spatial audio content defining an aural scene comprising the audio of a scene surrounding the spatial audio capture microphone array defined such that the three-dimensional arrangement of the audio in the scene is audibly presentable to a recipient user, an orientation of the aural scene defined relative to the rotatable spatial audio capture microphone array at the time of audio capture, and
captured direction data associated with the spatial audio content and representative of the direction of a reference direction of the spatial audio capture microphone array relative to the scene over a time during which the spatial audio content was captured;
to generate modified spatial audio content in which the aural scene is decoupled from any rotation of the rotatable spatial audio capture microphone array that occurred during capture of the spatial audio content for presentation to the recipient user relative to a space in which the recipient user is located by virtue of modification of the orientation of the aural scene using the captured direction data.

* * * * *